(12) United States Patent
Owen (10) Patent No.: US 10,430,170 B2
(45) Date of Patent: Oct. 1, 2019

(54) SYSTEM AND METHOD FOR CREATING AND DEPLOYING A RELEASE PACKAGE

(71) Applicant: ServiceNow, Inc., Santa Clara, CA (US)

(72) Inventor: James Owen, Cupertino, CA (US)

(73) Assignee: ServiceNow, Inc., Santa Clara, CA (US)

( * ) Notice: Subject to any disclaimer, the term of this patent is extended or adjusted under 35 U.S.C. 154(b) by 11 days.

(21) Appl. No.: 15/338,730

(22) Filed: Oct. 31, 2016

(65) Prior Publication Data

US 2018/0121182 A1    May 3, 2018

(51) Int. Cl.
*G06F 8/60* (2018.01)
*G06F 8/71* (2018.01)

(52) U.S. Cl.
CPC . *G06F 8/60* (2013.01); *G06F 8/71* (2013.01)

(58) Field of Classification Search
CPC .......................................................... G06F 8/60
USPC ......................................................... 717/174
See application file for complete search history.

(56) References Cited

U.S. PATENT DOCUMENTS

| | | | | |
|---|---|---|---|---|
| 8,418,165 B2* | 4/2013 | Hoff | ........................... | G06F 8/61 717/168 |
| 8,434,080 B2* | 4/2013 | Yendluri | ............... | G06F 9/5072 717/177 |
| 8,898,660 B2* | 11/2014 | Hieb | ........................ | G06F 8/73 717/174 |
| 8,997,088 B2* | 3/2015 | Gurikar | ..................... | G06F 8/61 717/168 |
| 2008/0196020 A1* | 8/2008 | Clinton | ..................... | G06F 8/65 717/172 |
| 2009/0300580 A1* | 12/2009 | Heyhoe | ..................... | G06F 8/71 717/106 |
| 2010/0131084 A1* | 5/2010 | Van Camp | ................ | G06F 8/65 700/86 |
| 2010/0319004 A1 | 12/2010 | Hudson et al. | | |
| 2013/0232463 A1* | 9/2013 | Nagaraja | ................... | G06F 8/61 717/101 |
| 2014/0280961 A1* | 9/2014 | Martinez | ............. | H04L 41/5054 709/226 |
| 2016/0239280 A1* | 8/2016 | Scheiner | ................... | G06F 8/60 |

(Continued)

OTHER PUBLICATIONS

Austin, "How to document releases and share release notes", 2015, Published at https://confluence.atlassian.com/doc/blog/2015/10/how-to-document-releases-and-share-release-notes.*

(Continued)

*Primary Examiner* — Hossain M Morshed
(74) *Attorney, Agent, or Firm* — Fletcher Yoder PC (57) ABSTRACT

A system for deploying software includes a processor programmed to identify a collection of deployable elements for use in deploying the software. The instructions also include instructions to receive information associating, with the collection of deployable elements, an item and an activity that is to be performed, using the item, when the software is deployed to a specified type of computing system. The instructions also include instructions to, using at least one of the collection of deployable elements, deploy the software to the specified type of computing system, and in response to a deployment of the software to the specified type of computing system, initiate performance of the activity.

20 Claims, 7 Drawing Sheets

(56) References Cited

U.S. PATENT DOCUMENTS

2017/0372247 A1* 12/2017 Tauber ................. G06F 8/71

OTHER PUBLICATIONS

Boone, "Automated deployment of distributed software components with fault tolerance guarantees", 2008, IEEE.*

Enrico, "Configuration files", 2013, Published at http://enrico.readthedocs.io/en/latest/configfile.html.*

Microsoft, "Software Update Status Messages", 2012, published at https://technet.microsoft.com/en-us/library/cc181133(d=printer).aspx.*

Rivera, "Approval Workfows You Can Automate With Comindware Tracker", 2015, Published at https://www.comindware.com/blog-approval-workflows-you-can-automate-with-our-software/.*

Technowinie, "Release Your Software", 2013, Published at https://blog.github.com/2013-07-02-release-your-software/.*

Boon, "Automated deployment of distributed software components with fault tolerance guarantees", 2008, IEEE Computer Scociety (Year: 2008).*

BMC Support Central, "Action Packs", BMC Release Package and Deployment 4.4—BMC Documentation, last modified Nov. 16, 2015, downloaded Oct. 19, 2016, https://docs.bmc.com/docs/display/public/brpd44/Action+packs, 2 pp.

Xebialabs, "Integrating Deployment Automation and Configuration Management", XebiaLabs Blog (http://blog.xebialabs.com), Date Unknown, downloaded Oct. 20, 2016, http://blog.xebialabs.com/2009/08/24/integrating-deployment-automation-and-configuration-management/, 4 pp.

Xebialabs, "Reference Manual 4.5.x", Product Docs, Reference Manual, Date Unknown, downloaded Oct. 20, 2016, https://docs.xebialabs.com/xl-deploy/4.5.x/referencemanual.html, 21 pp.

Xebialabs, "Tomcat Plugin Manual 4.0.x", Product Docs, Tomcat Plugin Manual, Date Unknown, downloaded Oct. 20, 2016, https://docs.xebialabs.com/xl-deploy-tomcat-plugin/4.0.x/tomcatPluginManual.html, 110 pp.

Microsoft, "Spark the Future", Microsoft Ignite, May 4, 2015, Chicago, IL, downloaded Oct. 20, 2016, https://www.google.com/url?sa=t&rct=j&q=&esrc=s&source=web&cd=3&cad=rja&uact=8&ved=0ahUKEwjdzaTHnd3NAhVC7IMKHS2bAcEQFggtMAI&url=http%3A%2F%2Fvideo.ch9.ms%2Fsessions%2Fignite%2F2015%2Fdecks%2FBRK2712_Brown.pptx&usg=AFQJCNGz2jH5bymB5jGCZxnDmKK5vzdr7A&sig2=85GoC-1aWdX4h5olgsLLbA, 31 pp.

Octopus Deploy, "Packaging Applications", Octopus Deploy 3.0, last modified Jan. 31, 2016, downloaded Oct. 20, 2016, http://docs.octopusdeploy.com/display/OD/Packaging+applications, 2 pp.

Octopus Deploy, "Configuration Files", Octopus Deploy 3.0, last modified Oct. 6, 2016, downloaded Oct. 20, 2016, http://docs.octopusdeploy.com/display/OD/Configuration+files, 7 pp.

Atlassian Blogs, "Continuous Deploymnet With Bamboo and Tomcat", May 15, 2011, downloaded Oct. 20, 2016, http://blogs.atlassian.com/2011/05/continuous_deployment_with_bamboo_and_tomcat/, 8 pp.

Paxcel Labs, "Automation of War/Ear Deployment Using Jenkins", Blog Post, Paxcel Labs (http://paxcel.net/index#creation), posted on Jul. 18, 2013, downloaded Oct. 20, 2016, http://paxcel.net/blog/automation-of-warear-deployment-using-jenkins/, 7 pp.

* cited by examiner

| ELEMENT REFERENCE | CONDITION | ACTIVITY |
|---|---|---|
| KNOWLEDGE ARTICLE 934 | ENVIRONMENT=PRODUCTION | PUBLISH |
| DEV STORY 456 | ENVIRONMENT=TEST | SET STATUS = TESTING |
| DEV STORY 456 | ENVIRONMENT=PRODUCTION | SET STATUS = PRODUCTION |
| NGNIX CONFIG ITEM | ENVIRONMENT≠PRODUCTION | DO NOT PROVISION |
| | ENVIRONMENT=PRODUCTION && PACKAGE = MINOR RELEASE | EXECUTE APPROVAL PROCESS: EMERGENCY CHANGE CONTROL WORKFLOW |
| | ENVIRONMENT=PRODUCTION && PACKAGE = MAJOR RELEASE | EXECUTE APPROVAL PROCESS: STANDARD CHANGE PROCESS WORKFLOW |

SYSTEM AND METHOD FOR CREATING AND DEPLOYING A RELEASE PACKAGE

TECHNICAL FIELD

This disclosure relates in general to deployment of software releases in one or more different types of computing environments.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Creating and deploying a new release of a software system can involve multiple phases such as a development phase, a testing phase, a pre-production testing phase, followed by a release-to-production phase. Some of the phases are carried out in separate computing environments. For example, the testing phase can be carried out in a computing environment that nearly, but not necessarily completely, mirrors a production environment while the pre-production environment can mirror the production environment more closely. In order to deploy or install the software system in an environment, the constituent parts of the software system are deployed to the environment.

To facilitate the deployment of a release of a software system to an environment, the release can be bundled as a release package. A release package is a collection of elements, such as computer code, used to configure, install and/or run the software. Examples of these elements include software binaries, scripts, and HTML files, configuration files, and other development artifacts. The elements can also include or require off-the-shelf components such as, for example, an Apache Tomcat® server. A release package can then be used to deploy the software on different computer systems of the environments

BRIEF DESCRIPTION OF THE DRAWINGS

The description herein makes reference to the accompanying drawings, wherein like reference numerals refer to like parts throughout the several views.

DETAILED DESCRIPTION

The systems and methods of this disclosure address problems, particular to distributed computing systems, encountered in deploying software. Software is typically deployed onto a target computing environment using release packages or other collections of elements. In the disclosed implementations, these elements can include release items and deployable elements, as described below. Examples of deployable elements include binaries, web application archive (WAR) files, and other artifacts that can be used to configure the target system, configure the software, and/or install software onto the target system.

One problem that arises in the deployment of software is that different release packages may be required depending upon the type of environment to which the software is deployed, the phase of development during which the deployment takes place and/or other conditions. For example, a release package intended for deploying software on a production environment may deploy different elements (or may perform different activities on, or using, those elements) than a release package intended for deploying software on a testing environment. Conventionally, this problem may result in a multiplicity of release packages each intended for deployment on different environments, or in release packages that do not have all of the elements (or cannot perform all of the activities) useful for deployment on a particular computing environment or during a particular stage of development. Alternatively, selective deployment can be accomplished, for example, by manual steps, customized scripts, or the like. Such approaches can be time consuming, brittle, and error prone, and can proliferate the number the release packages to be created and maintained per release.

To address such problems, in some implementations disclosed herein, a more robust, flexible and efficient system for deploying software is provided, in which at least some of the elements of release packages are associated with rules that specify the performance of an activity when one or more conditions are met. Such conditions can relate to, for example, the type of environment on which the software is being deployed, or the stage of development of the software. If the condition is met, the activity can be performed. The activity can include deploying a deployable element, for example. In this manner, a release package can be developed for use in deploying software across multiple types of target environments during and after the development of the software.

For example, upon a request to deploy a release package to a target environment, the system can evaluate the rules or other conditions to determine which deployable elements in the release package should be deployed or whether the release package is to undergo special processing before being deployed to the target environment. The system can also evaluate the rules to determine, for example, whether a specific deployable element of the release package should undergo special processing before being deployed to the target environment.

Another problem that arises in the deployment of software is that, apart from the physical deployment of the software, there can be extrinsic tasks, processes and other activities that are performed and tracked in connection with the deployment itself. Some of these activities may involve manual processes and the nature of these activities may vary depending on the type of environment onto which the software is installed. It may be inconvenient or time-consuming to track these types of activities. These activities may also be associated with release items, which include for example materials used by developers and the enterprise for whom they work in the development and release process, such as change requests, approval workflows, problem reports, incident reports, stories, and knowledgebase articles. Release items and their associated activities may in some case require manual processing or other forms of human intervention.

To address such problems, some of the disclosed implementations provide the ability to associate release items and related activities with release packages. These activities can in some cases be associated with rules that specify conditions for taking actions. Such conditions can relate to, for example, the type of environment on which the software is being deployed, or the stage of development of the software. When the condition is met, the activity can be performed. Thus, a release package can be developed for use in tracking and deploying release items when software is deployed across multiple types of target environments, both during and after the development of the software.

For example, it may be desirable to publish a knowledgebase article when software is deployed to a production environment but not when the software is deployed to a testing environment. It may also be desirable to obtain approvals before deploying software in a production environment. Rather than providing separate release packages (one for testing and one for deployment), an implementation disclosed herein associates a release package with a knowledgebase article (e.g., the release item), an activity (e.g., publish the article) and/or a rule or other condition (e.g., publish the article only when the software is deployed to a production environment). When the release package is used to deploy the software on a testing environment, the knowledgebase article is not published; however, when the release package is used to deploy the software on a production environment, the knowledgebase article can be published.

Yet another problem that arises in the deployment of software is that configuring some deployable elements of the software uses parameters which must be provided by the programmer or other person deploying the release package. The provision of these parameters is time consuming and may result in errors, particularly as systems change. To address such problems, in some of the disclosed implementations, the release package can include a deployable element (such as a configuration file) having configuration data derived from a configuration management database (CMDB), in some cases at the time of deployment. The CMDB can hold, for example, standard configuration or configuration parameters for deployable elements. Generating deployable elements or deployable element configurations from a CMDB can facilitate having deployable element configurations that are consistent, complete, error free, and adhere to applicable standards.

Figure 1:
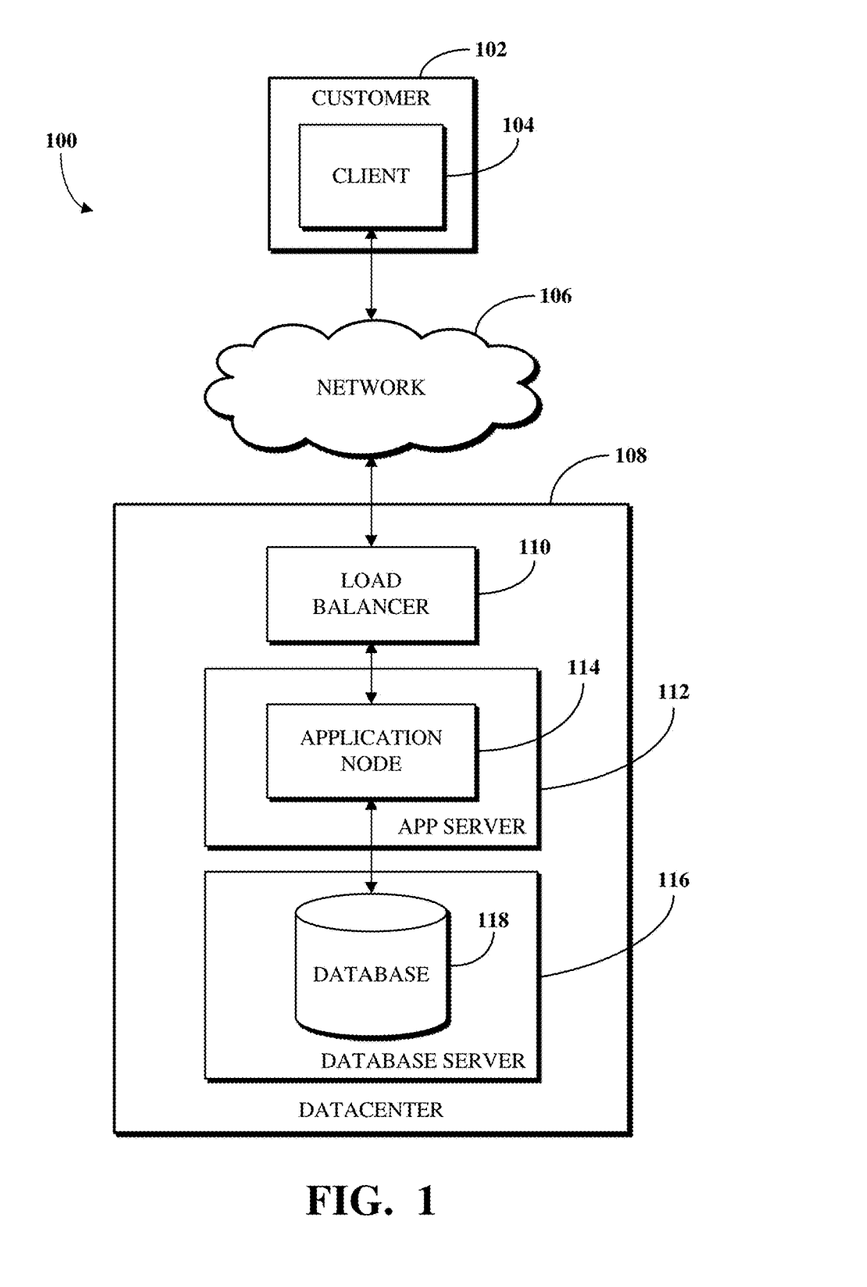
FIG. 1 is a block diagram of an example of an electronic computing and communications system.

To describe some implementations in greater detail, reference is first made to examples of hardware structures. FIG. 1 is a block diagram of an example of an electronic computing and communications system 100 in accordance with this disclosure. As used herein, the term "electronic computing and communications system," or variations thereof, can be, or include, a distributed computing system (e.g., a client-server computing system), a cloud computing system, a clustered computing system, or the like.

The system 100 can include one or more customers 102, which may be a public entity, private entity, or other corporate entity or individual that purchases or otherwise uses services of a software provider, such as a PaaS service provider. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or a combination of physical units. In some implementations, a single physical unit can include multiple clients.

The client 104 can be an instance of an application running on a customer device associated with the customer 102. As used herein, the term "application" can include, but is not limited to, applications, programs, instances, processes, threads, services, plugins, patches, application version upgrades, or any other identifiable computing unit capable of accessing or interacting, directly or indirectly, with a database. The system 100 can include any number of customers or clients or can have a configuration of customers or clients different from that generally illustrated in FIG. 1. For example, and without limitation, the system 100 can include hundreds or thousands of customers and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated or communicate with one or more datacenter networks or domains, which can include domains other than the client domain.

The client 104 and the servers associated with the datacenter 108 may be configured to connect to, or communicate via, a network 106. Furthermore, a client 104 associated with the customer 102 can connect to the network 106 via a communal connection point, link, or path, or using a distinct connection point, link, or path. A connection point, link, or path can be wired, wireless, use other communications technologies, or a combination thereof.

The network 106 can include, for example, the Internet, and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communication traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticking sessions, between a client and a service or application provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108, and the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve data from a database, such as the database 118 of the database server 116.

The application server 112 can include any suitable number of application nodes, depending upon a system load or other characteristics associated with the application server 112. For example, and without limitation, the application server 112 can include two or more nodes forming a node cluster. The application nodes implemented on a single application server 112 may run on different hardware servers.

The database server 116 can be configured to store, manage, or otherwise provide data for delivering services to the client 104 over a network. The database server 116 may include a data storage unit, such as a database 118, which can be accessible by an application executed on the application node 114. The database 118 may be implemented as a relational database management system (RDBMS), an object database, an XML database, a CMDB, a management information base (MIB), one or more flat files, other suitable non-transient storage mechanisms, or a combination thereof.

By way of non-limiting example, the system 100, in some implementations, can include an XML database and a CMDB. While limited examples are described, the database 118 can be configured as or comprise any suitable database type. Further, the system 100 can include one, two, three, or any suitable number of databases configured as or comprising any suitable database type or combination thereof.

The database 118 can be configured as or comprise a CMDB. A CMDB can be comprised of a plurality of configuration items (CIs), attributes associated with the CIs, or relationships between CIs. A CI can be a CMDB record that represents an infrastructure entity, device, or units of the system 100. For example, the customer 102, the client 104, the network 106, the datacenter 108, the load balancer 110, the application server 112, the application node 114, the database server 116, the database 118, or any other element, portion of an element, or combination of elements of the electronic computing and communications system 100 can be represented in the CMDB by a CI.

The CMDB can include information describing the configuration, the role, or both the configuration and the role, of an element of the system 100. In some implementations, an MIB can include one or more databases listing characteristics of the elements of the system 100. In some implementations, an object identifier (OID) can represent object identifiers of objects or elements in the MIB.

One or more databases (e.g., the database 118), tables, other suitable information sources, or portions or combinations thereof may be stored, managed, or otherwise provided by one or more of the elements of the system 100 other than the database server 116, such as the client 104 or the application server 112.

Some or all of the systems and methods described herein can operate or be executed on or by the servers associated with the system 100. For example, an update for an application executed on the application node 114 can include updating or upgrading the database 118. In some implementations, the systems and methods described herein, portions thereof, or combinations thereof can be implemented on a single device, such as a single server, or a combination of devices, for example, a combination of the client 104, the application server 112, and the database server 116.

In some implementations, the system 100 can include devices other than the client 104, the load balancer 110, the application server 114, and the database server 116 as generally illustrated in FIG. 1. In some implementations, one or more additional servers can operate as an electronic computing and communications system infrastructure control, from which servers, clients, or both servers and clients, can be monitored, controlled, configured, or a combination thereof.

The network 106, one or more datacenters, such as the datacenter 108, and one or more load balancers, such as the load balancer 110, may be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., such as an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the database 118, and the secondary datacenter can include a secondary database. The secondary database can include an exact or substantially exact mirror, copy, or replication of the primary database. The primary database or the secondary database can be implemented as an RDBMS, an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a service or application to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

A distributed computing system can allocate resources of a computer network using a multi-tenant or single-tenant architecture, for example. Allocating resources in a multi-tenant architecture can include installations or instantiations of one or more servers, such as application servers, database servers, or any other server, or combination of servers, that can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. Customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as RAM, storage, communications bandwidth, or processor cycles.

A customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

Figure 2:
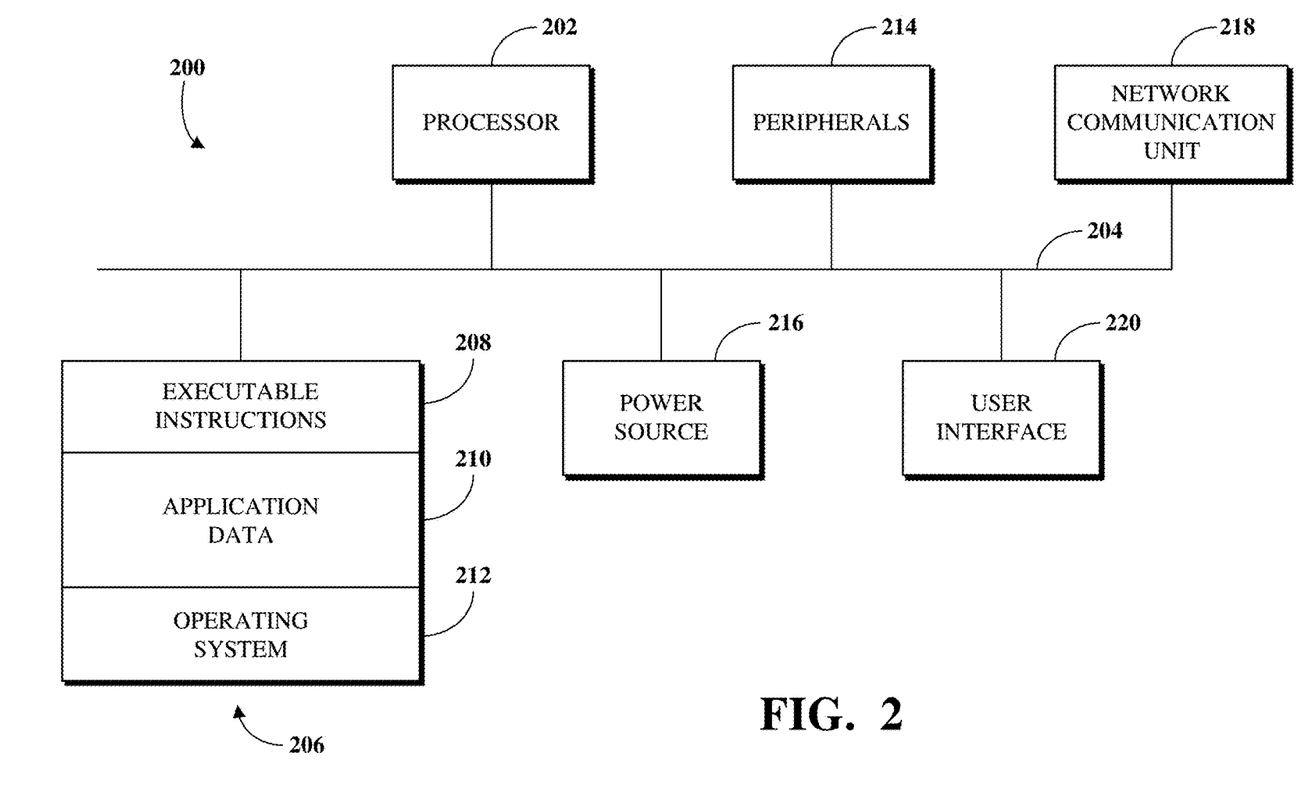
FIG. 2 is a block diagram of an example internal configuration of a computing device of the electronic computing and communications system shown in FIG. 1.

FIG. 2 generally illustrates a block diagram of an example internal configuration of a computing device 200, such as a client 104 or a server, such as an application server 112 or a database server 116, of the system 100 as generally illustrated in FIG. 1. As previously described, a client or server can be a computing system including multiple computing devices or a single computing device, such as a mobile phone, a tablet computer, a laptop computer, a notebook computer, a desktop computer, a server computer, or other suitable computing devices. A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now-existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 206 can include another type of device, or multiple devices, now-existing or hereafter developed, capable of storing data or instructions for processing by the processor 202. The processor 202 can access or manipulate data in the memory 206 via the bus 204. Although depicted here as a single bus, the bus 204 can be composed of multiple buses, which can be connected to one another through various bridges, controllers, or adapters.

Although shown as a single block in FIG. 2, the memory 206 can be implemented as multiple units. For example, a computing device 200 can include volatile memory, such as RAM, and persistent memory, such as a hard drive or other storage. The memory 206 can be distributed across multiple clients or servers, such as network-based memory or memory in multiple clients or servers performing the operations of clients or servers.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions to package and deploy deployable of a release package. The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®; and an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, a client or server can omit the peripherals 214. In some implementations, the power source 216 can be a battery, and the computing device 200 can operate independently of an external power distribution system. Any of the components of the computing device 200, such as the peripherals 214 or the power source 216, can communicate with the processor 202 via the bus 204.

The network communication unit 218 can also be coupled to the processor 202 via the bus 204. In some implementations, network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display, (e.g., an OLED display), or other suitable display.

Figure 3:
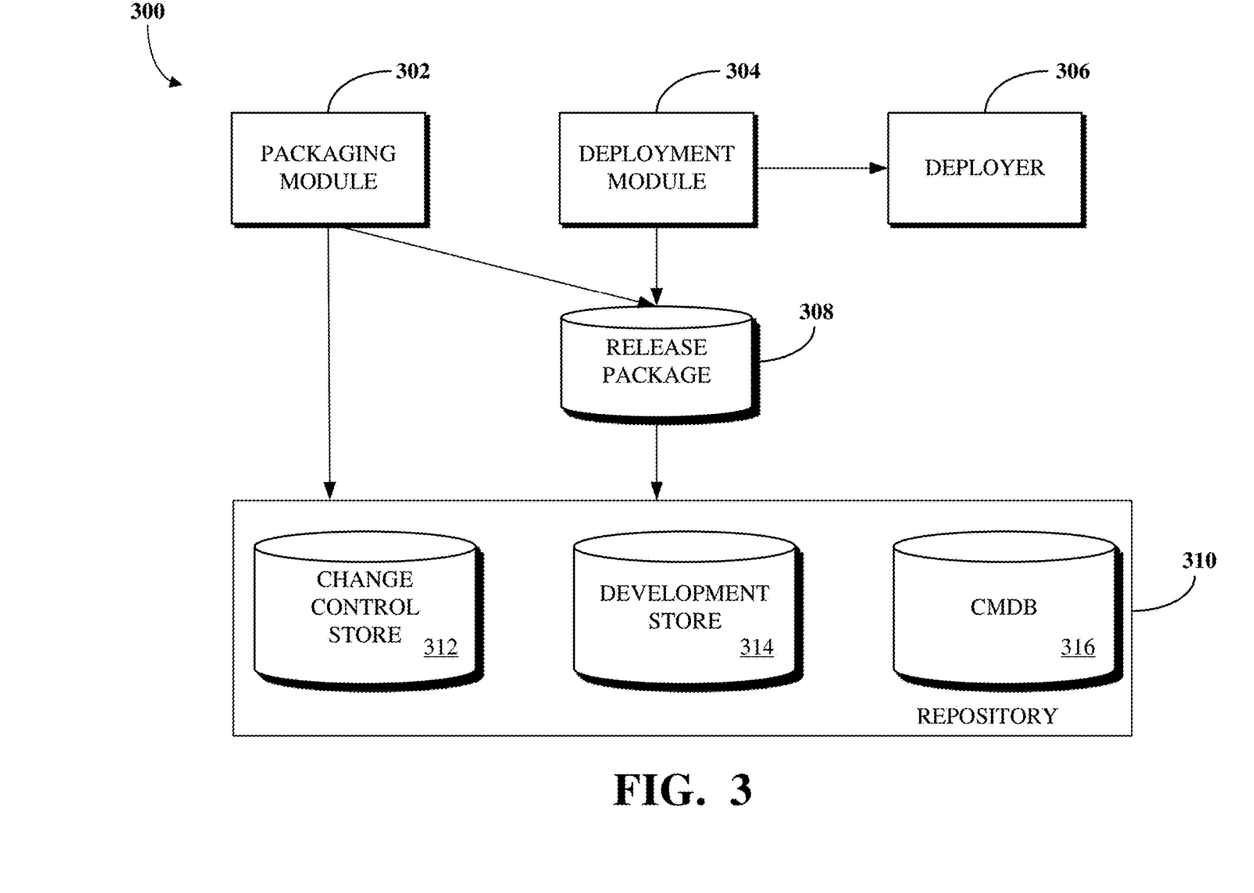
FIG. 3 is a block diagram of an implementation of a package deployment system.

FIG. 3 is a block diagram of an implementation of a package deployment system 300. The package deployment system 300 can be an application node, such as the application node 114, and can include modules such as a packaging module 302, a deployment module 304, and a deployer 306. The deployer 306 can be one or more deployers. Alternatively, the package deployment system 300 may not include the deployer 306. For example, the package deployment system 300 can communicate with a deployer 306 provided by another system.

The packaging module 302 associates a collection of release elements with software or an activity associated with software, such as a software release. The collection of release elements can constitute a release package. Based on the requirements of a release (e.g. the stories to be implemented for the release), the packaging module 302 can, for example, compile source code files related to the release requirements and include the compiled files into a release package. The packaging module 302 can also allow, for example, a developer or a release manager to manually add release elements to collection or release elements. As such, the packaging module 302 can be configured to create a release package 308. A release element can be a deployable element or a release item. A release item can be a release element that is not a deployable element. Metadata attributes can be associated with the release package 308. The metadata attributes can include a label, a description, a major version number, or a minor version number, and/or information indicating whether the release package 308 is for a specific customer, whether the release package 308 is for a specific industry, or whether the release package 308 is a temporary patch. More, less, or other metadata attributes and semantics can be available.

Figure 5:
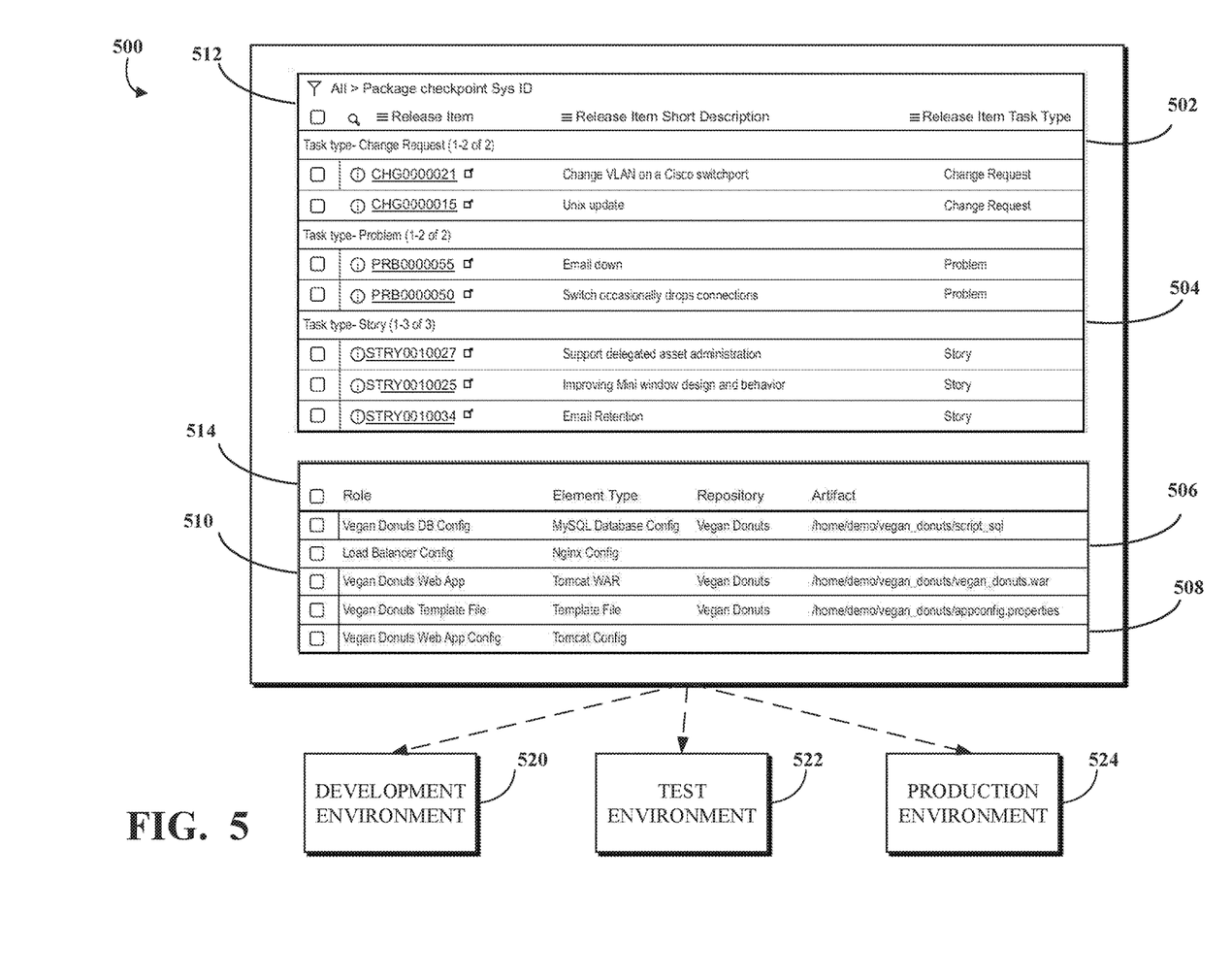
FIG. 5 is an example of a release package.

A deployable element can be a software component, a configuration file, a development artifact, or the like, used to install, used to configure, required for the functioning and use, or required for the execution of the subject software. A deployable element can be a deployable which can be represented by a CI of a CMDB as described above. A deployable element can be an update to, or be used to update, an already deployed component. A deployable element can represent a component to be installed with or for the software version. A release item can be a release element that is not a deployable element. A release item can, for example, represent a business or other artifact that describes a new software feature, a modification to a software feature, a problem with a software feature, or the like. Non-limiting examples of release item and deployable elements of release package 500 are shown in FIG. 5. Release package 500 can be the release package 308.

The release package 500 can include release items 512. The release items 512 can include, as illustrated and without limitation, change requests, problem reports, incident reports, and stories. The release items 512 can be, or can reference, pre-development, in-development, or post-development release items. Pre-development release items can include items that represent the requirements for a specific software version. In-development release items can include items that constitute additional requirements added during the development phase such as, for example, defects resulting from a testing phase. Post-development release items can be release items related to a software version but are not deployable elements 514. Post-development release items can include, for example and without limitation, a documentation element, such as release notes, release documentation, and knowledgebase articles. A knowledgebase article can, for example and without limitation, describe how a task can be accomplished in the software version or describe how a feature can be configured. A release item can be related to another release item. For example, a knowledgebase article release item describing the resolution of a change request can be related to a change request release item.

The deployable elements 514 can include database configuration files, such as SQL DDL scripts. The deployable elements 514 can include, for example, executable and/or interpreted code files, such as a Java class, a Java servlet, a JSP page, an .exe file, a script file, a jar file, and the like. The collection of deployable elements 514 can include a Tomcat WAR file, Tomcat configuration file, an EAR file, or the like. The Nginx config 506 is an example of a deployable element that is a configuration file of a Nginx component which can be configured to be a web server, a proxy server, or a load balancer. Tomcat config 508 is an example of a deployable element that is a configuration file of a Tomcat web server.

Referring back to the packaging module 302, the packaging module 302 can be configured to add elements to a release package 308 from a repository 310. The repository 310 can be multiple repositories. Adding an element to the release package 308 can include copying the element from the repository 310, creating a deployable element or a release item based on content of the repository 310, creating a link in the release package 308 to an item in the repository 310, or any combination thereof. Other ways of adding an element to the release package 308 can be available depending on the semantics of the element.

The repository 310 can include a change control store 312, a development store 314, and a CMDB 316. Any of the change control store 312, the development store 314, or the CMDB 316 can be one or more systems with which the packaging module 302 can communicate.

The packaging module 302 can add a release item change request from the change control store 312 to the release package 308. For example, and referring to FIG. 5, the change request 502 illustrates that the release package 500 contains a reference to the change request CHG00000021. A change request can be added to a release package when, for example, the software version corresponding to the release package contains other deployable elements which address (e.g. resolve) the change request.

Packaging module 302 can add development artifacts from the development store 314. The development store 314 can be a requirements management system, a bug tracking system, an issues tracking system, or the like. For example, and referring to FIG. 5, stories 504 illustrates that the release package contains references to the stories STRY0010027, STRY001025, and STY0010034 which can be stored in an Agile development system. A story can be added to a release package when, for example, the software version corresponding to the release package contains other deployable elements which address (e.g. implement) the story.

The development store 314 can be a source code control repository. The packaging module 302 can reference deployable elements in the development store 314. The packaging module 302 can create a deployment element based contents of the development store 314. For example, and without limitation, the development store 314 can create a Tomcat WAR 510 deployable by extracting files from the source code control system to create the WAR file. The packaging module 302 can contain a reference to a location of the WAR file (e.g. /home/demo/vegan_donuts/vegan_donuts.war).

The packaging module 302 can use information in a CMDB 316 to create deployable elements from corresponding CIs. By way of example, and without limitation, in creating the Tomcat config 508 deployable, the packaging module 302 can be configured to leverage the definition of the Tomcat configuration CI type of the CMDB to set a configuration of the deployable. For example, the Tomcat configuration CI type can have attributes relating to the AJP port, catalina options, port, configuration directory, log directory, Java options, and the like. The packaging module 302 can be configured to create the Tomcat config 508 deployable by receiving, such as from a user, values for at least some of the attributes of the Tomcat configuration CI type. Creating a deployment element from a CI can result in the packaging module 302 creating a CI for the deployable element in the CMDB 316 and adding a reference to the CI in release package 308.

As will be explained below with respect to FIG. 4, the packaging module 302 can be configured to associate rules or other conditions with the release package 308 or an individual element (e.g. a deployable element or a release item) of the release package 308. The packaging module 302 can provide a user interface usable by a user to create and modify rules. A rule associated with a release package can be a rule associated with the release package itself, a rule associated with an element of the release package, or a combination thereof.

The deployment module 304 deploys the release package 308 to a specified environment. A specified environment can be a single computing device, such as the computing device 200, or multiple computing devices. Multiple deployable elements of the release package 308 can be deployed to a single computing device. The specified environment can be, partially or completely, a datacenter 108. The specified environment can include some or all of an application server, such as the application server 112; a database server, such as the database server 116; an application node, such as the application node 114; or a database, such as the database 118. FIG. 5 is an example of a release package 500, which is deployable as indicated by the dashed lines, to a development environment 520, a test environment 522, or a production environment 524.

Deploying a package by the deployment module 304 can include transferring some or all of the deployable elements of the release package 308 to the specified environment; executing a rule associated with the release package 308; executing a rule associated with a deployable item of the release package 308; executing a rule associated with a release item of the release package 308; initiating a request to a deployer to perform an action based on a deployable; transferring a deployable element to the deployer 306; installing a deployable element; causing to be installed, such as by a deployer, a deployable element; updating an already installed deployable; causing to be updated, such as by a deployer, an already installed deployable; or the like, or any combination thereof. The preceding is a non-limiting, non-exhaustive, list of the meanings of deploy. Deploying an element of a release package can have a different implementation and semantic than those listed herein based on the type of the element.

The deployment module 304 can be configured to deploy the release package 308 in response to a user requesting that the release package 308 be deployed to a user-specified environment. The deployment module 304 can be configured to deploy the release package 308 automatically, such as based on a continuous delivery pipeline or a continuous integration pipeline. Other triggers can be available to cause the deployment module 304 to deploy a release package.

The deployment module 304 can be configured to deploy the release package 308 in response to an event associated with a software development activity, for example, an event associated with a task of a software development project. By way of example and without limitation, the event associated with a task can be the acceptance by a developer of a development task. In such an implementation, the deployment module 304 can be configured, for example, to deploy the release package 308 resulting in the creation of a computing environment appropriate for the developer's development task. As another non-limiting example, the event can be the moving (e.g., by a QA engineer) of a testing task associated with a development project from an open status to a work-in-progress status. In such an implementation, the deployment module 304 can be configured to deploy the release package 308 resulting in the creation of a computing environment appropriate for the testing task. Other configurations of the deployment module 304 and semantics of deployment can be available.

The deployer 306 can be a configured to deploy an element to or on a computing device. For example, and without limitation, the deployer 306 can be implemented using ServiceNow, Chef, Puppet, or combinations thereof. For example, and without limitation, upon a release package containing a Tomcat deployable, such as the Tomcat WAR 510, the deployment module 304 can transfer the artifact /home/demo/vegan_donuts/vegan_donuts.war to a Chef system which can, in turn, deploy the artifact. The deployer 306 can perform the activity of a rule as explained below with respect to FIG. 4. For example, and without limitation, the deployer 306 can, as required by rule 410, set the status of development story with identifier "456" to TESTING.

In some implementations, some or all of the modules, components, and repositories associated with the package deployment system 300 can be implemented as a software application or can execute a software application to provide some or all of the features associated with a respective module or component. The package deployment system 300 can include more or less modules. For example, the deployment module 304 can perform the actions of a deployer 306. That is, a deployer 306 can be merged with the deployment module 304.

The package deployment system 300 can be implemented using computing devices, such as the computing device 200, or can be implemented as described with respect to system 100 in FIGS. 1 and 2. The package deployment system 300 can be implemented, for example, by a machine-readable program or other computer-executable instructions, such as instructions or programs described according to JavaScript, C, or other such instructions. The modules of package deployment system 300 can, for example, be implemented using computer hardware, firmware, software executed by hardware, circuitry, or a combination thereof.

Figure 4:
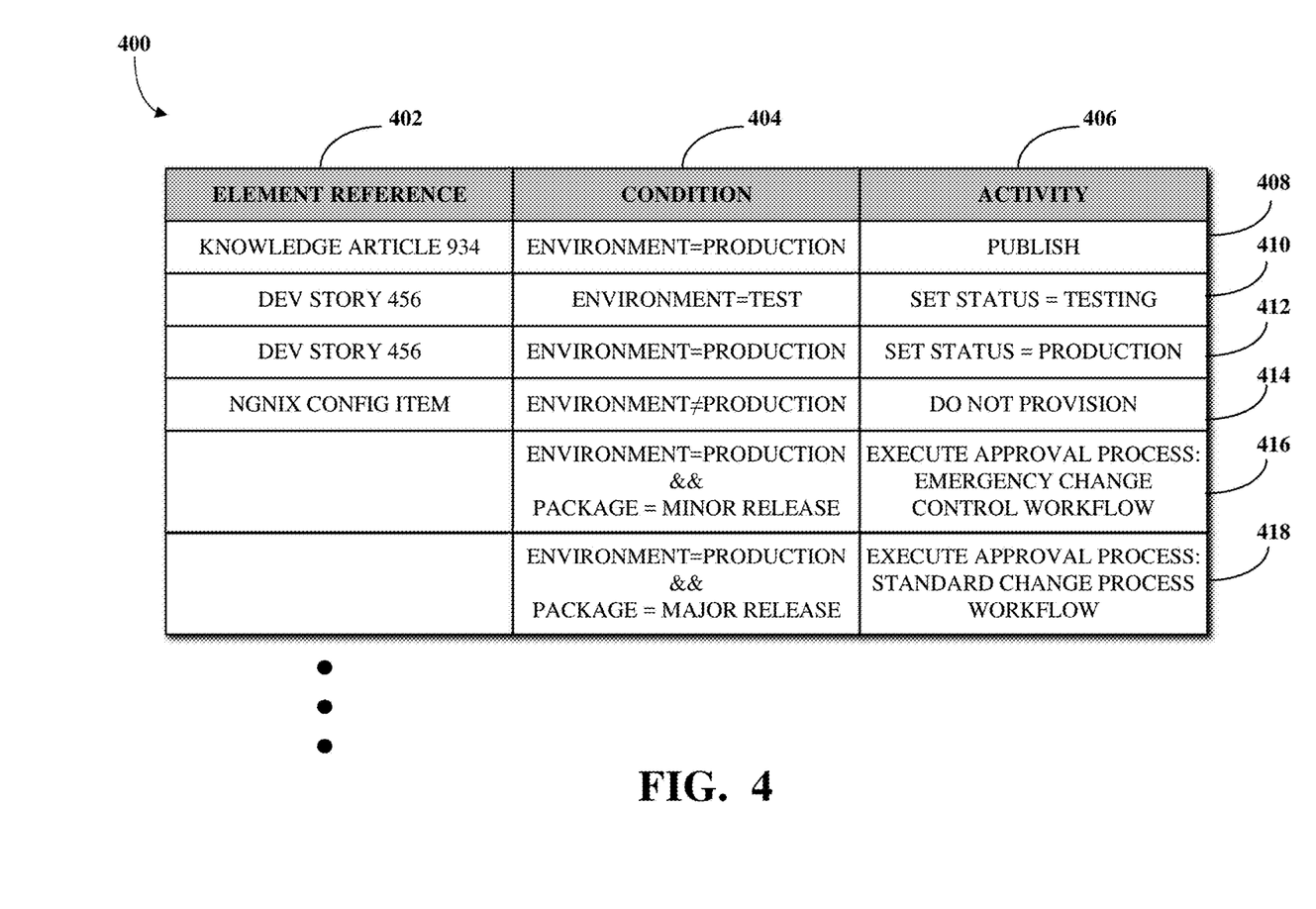
FIG. 4 is an example of a data structure usable with a package deployment system.

FIG. 4 is an example of a data structure 400 usable with a package deployment system. Rules in the data structure 400 can be created or updated by the packaging module 302 and used by the deployment module 304 to deploy the release package 308 to a specified environment. The data structure 400 can include an element reference 402, a condition 404, and an activity 406.

The element reference 402 can indicate a reference to an element of a release package in a repository, such as the repository 310, or can indicate a reference to the element in the release package when the element is contained in the release package. For example, rule 408 is a rule specific to the deployable knowledgebase article with the identifier 934. In some implementations, the knowledgebase article can be stored in a repository, such as the CMDB 316. For example, the rule 410 and the rule 412 are rules specific to the development story with the identifier "456" which can be stored in the development store 314.

When the element reference 402 is unspecified, as in the rule 416, then the rule can apply to the release package itself. If a rule applies to the release package, then the element reference 402 can include a reference to the release package, such an identifier of the release package. The condition 404 can be any expression that can result in a value that the deployment module 304 can use to determine whether to perform the activity 406 of a rule. For example, and without limitations, the condition 404 can be a logical expression, an executable script, program instructions, a database query, or the like. The condition 404 can be unspecified indicating that the deployment module 304 is to unconditionally perform the activity 406.

A rule in the data structure 400 can be read as "for the element of the release package specified in the element reference 402, if the condition specified in the condition 404 is satisfied, then perform the action specified in the activity 406." Said differently, "for the element of the release package specified in the element reference 402, upon satisfaction of the condition specified in the condition 404, initiate performance of the action specified in the activity 406." Satisfaction of the condition can be, at least partially, based on a determination that the type of target environment a release package is being deployed to matches the specified type of computing environment specified in a condition. Non-limiting examples of rules are now described.

The rule 408 indicates that the knowledgebase article with identifier "934" is to be published upon the release package being deployed to a production environment. Publish can include setting an attribute on the knowledgebase article indicating that it is publicly visible, such as to authorized end users. Alternatively, or additionally, publish can include making a copy of the knowledgebase to a production server such that the knowledgebase article becomes visible to authorized end users. Other semantics and implementations of publishing can be available.

The rule 410 indicates that a status indicator (e.g. a status attribute) of the development story with identifier "456" is to be set to a status of TESTING upon the release package being deployed to a testing environment. The rule 412 indicates that the development story with identifier "456" is to set to a status of PRODUCTION upon the release package being deployed to a production environment.

The deployment module 304 can be configured to execute some rules only upon determining some other deployable elements were successfully deployed. For example, and without limitation, the deployment module 304 can be configured to execute the activities of the rules 408-412 only after successful execution of activities (not shown) associated with at least some of the deployable elements 514.

Figure 6A:
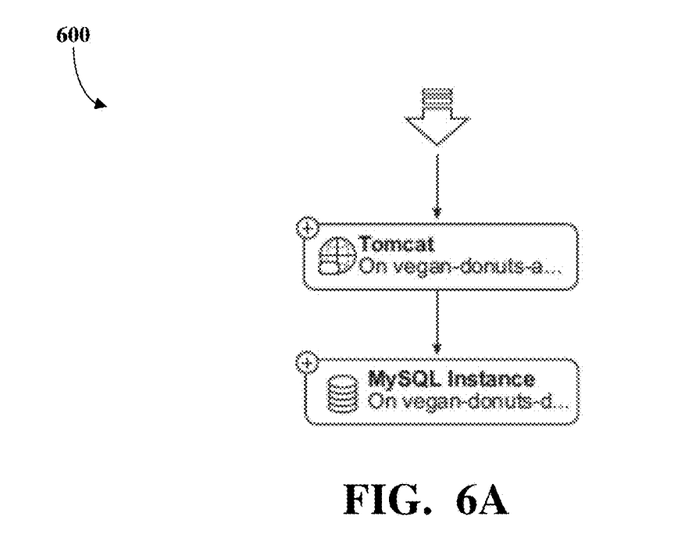
FIGS. 6A-6B are examples illustrating deploying a release package to a non-production environment and to a production environment.
Figure 6B:
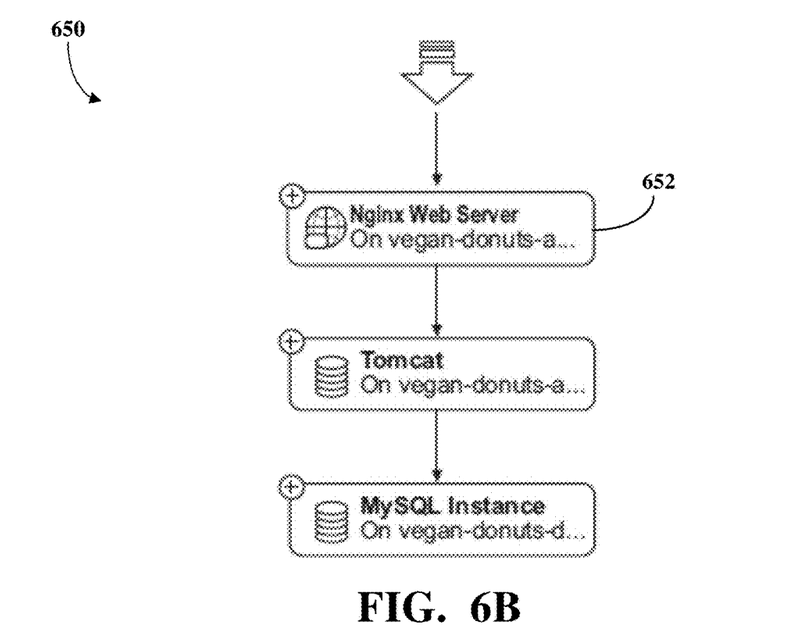

The rule 414 indicates that an Nginx server is to not to be provisioned when the release package is not being deployed to a production server. As such, when the release package is being deployed to a production server, then an Nginx server is to be provisioned. A deployment element can be provisioned based on a configuration item, such as a configuration item in the CMDB 316. Provisioning can include instantiation of a deployment element based on the configurations specified in the configuration item. FIGS. 6A-6B graphically depict the deployment of a release package based on the deployable elements 514 and the rules of the data structure 400. The non-production deployment 600 depicts the deployment elements being deployed to a non-production environment, such as a development environment. Given the rule 414, an Ngnix server is not being provisioned, e.g. not depicted in the non-production deployment 600. On the other hand, an Nginx server 652 is being provisioned in the production deployment 650.

The rule 416 is a rule associated to the release package. The rule 416 indicates that an approval process, and more specifically, an emergency change control workflow, is to be executed when the release package is to be deployed to a production environment and a metadata attribute of the release package indicates that it is a minor release package. In some implementations, the deployment module 304 does not proceed with the deployment of the release package unless the deployment module 304 receives an indication to proceed with the deployment from the emergency change control workflow. Not receiving an indication to proceed can be considered an unsuccessful completion of the workflow. The workflow can be a computer-implemented workflow.

The rule 418 is another rule associated with the release package. The rule 418 indicates that an approval process, and more specifically, a standard change process workflow, is to be executed when the release package is to be deployed to a production environment and a metadata attribute of the release package indicates that it is a major release package. In some implementations, the deployment module 304 does not proceed with the deployment of the release package unless the deployment module 304 receives an indication to proceed with the deployment from the change process.

The data structure 400 can have different data elements or different semantics than those shown in FIG. 4. In some implementations, the data structure 400 can have additional data elements, omit data elements, or modified versions of the data elements 402-406. For example, the data structure 400 can include a data element indicating a type of element of the release package (e.g., change request, problem report, incident report, knowledgebase article, development story, etc.). For example, the data structure 400 can include an element indicating the release package to which a rule is associated. For example, the data structure 400 can include a data element indicating a second action to be performed by the deployment module 304 upon an unsuccessful completion of an action indicated in the activity 406.

Other data elements can also be available. For example, the data structure 400 can include an order data element. When multiple rules, for example, apply to a same release package element or have the same conditions, the deployment module 304 can use the order element to determine the order of evaluation of the rules. In some implementations, the order element can be used to order the evaluation of all the rules of a release package.

Other data elements can also be available. For example, the data structure 400 can include a data element indicating an action to be performed upon a deployer 306 encountering a defined condition. In such an implementation, the defined condition can indicate, for example, an unsuccessful completion of a deployment activity and the action can indicate a failure workflow to prompt a user to take action. The workflow can report to the user an error message reported by the deployer 306. The workflow can require the user to specify a resolution. For example, the user can indicate that the deployment module 304 is to retry the failed deployment action. The user can indicate that the deployment module 304 is to stop the deployment of the release package. The user can indicate that the deployment module 304 is to continue deploying subsequent deployable elements of the release package 308. Other resolutions can be available.

Figure 7:
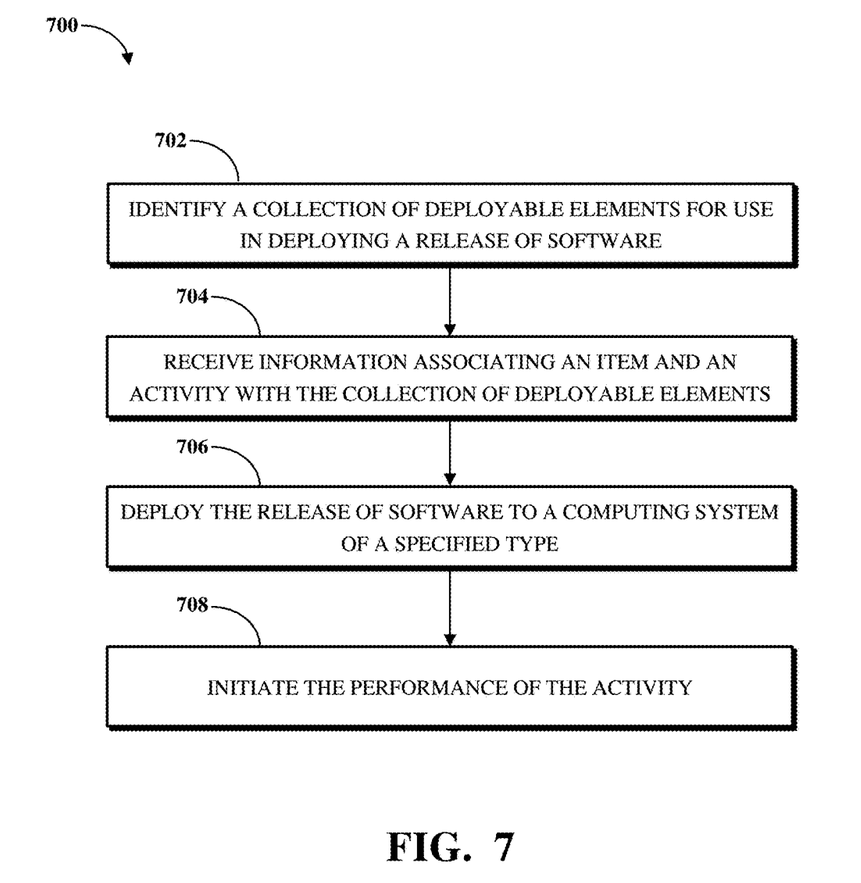
FIG. 7 is a flowchart illustrating an example of a technique for deploying software in a distributed computing system.

FIG. 7 is a flowchart illustrating an example of a technique 700 for deploying software in a distributed computing system, such as the system 100 as generally illustrated in FIG. 1. A technique 700 can be executed using computing devices, such as the systems, modules, and devices described with respect to FIGS. 1, 2, and 3. The technique 700 can be performed, for example, by executing a machine-readable program or other computer-executable instructions, such as instructions or programs described according to JavaScript, C, or other such instructions. The steps, or operations, of the technique 700 or any other method, process, or algorithm described in connection with the implementations disclosed herein can be implemented directly in hardware, firmware, software executed by hardware, circuitry, or a combination thereof.

Technique 700 can include operations 702-708. At operation 702, a collection of deployable elements for use in deploying software is identified. The collection of deployable elements can be a release package. A deployable element can be one of an executable code file, a script file, a JAR file, a WAR file, or a configuration file. A deployable element can be configured based on a configuration item in a CMDB. Configuring a deployable based on a CI can include steps to receive an input indicating a configuration item and set a configuration of a deployable based on details of the configuration item. For example, and without limitation, the configuration item in the CMDB can be a CI type or an existing CI that is based on a CI type. As such, at least a portion of the computing environment can be configured using the configuration data.

At operation 704, information associating an item and an activity with the collection of deployable elements is received. The activity is to be performed using the item when the software is deployed to a specified type of computing system. The item can be a release item, a computer-implemented workflow, other type of item, or any combination thereof. A rule can be associated with the release package, a deployable element of the release package, an item of the release package, or a combination thereof. The rule can include a condition such that the activity is performed using the item when the condition is satisfied. The condition can be based in part on the type of computing environment to which the collection of deployable elements is to be deployed.

At operation 706, using at least one of the collection of deployable elements, the software is deployed to the specified type of computing system. At operation 708, in response to a deployment of the software to the computing system of the specified type, the performance of the activity in accordance with the rule is initiated.

Although the technique 700 is shown as a series of operations for clarity, implementations of the technique 700 or any other technique, process, or algorithm described in connection with the implementations disclosed herein can be performed in various orders or concurrently. Additionally, operations in accordance with this disclosure can be performed with other operations not presented and described herein. The deployable element can be configured based a configuration item type or template. The technique 700 can include operations to perform a discovery of the specified environment. The discovery process can find computers, software, and other devices of the specified environment and can update or create corresponding CIs in a CMDB, such as the CMDB 316. The discovery process can update an existing CI, corresponding to a deployed deployable element, by, for example, versioning the existing CI. Furthermore, one or more aspects of the systems and techniques described herein can be omitted.

All or a portion of the implementations of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array, (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components, for example, memory elements, processing elements, logic elements, look-up tables, and the like, which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated otherwise by the context to be directed to a singular form. Moreover, use of the term "an implementation" or the term "one implementation" throughout this disclosure is not intended to mean the same embodiment or implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

The use of the terms "a," "an," "the," or similar referents in the context of describing the systems and techniques (especially in the context of the following claims) should be construed to cover both the singular and the plural. Furthermore, unless otherwise indicated herein, the recitation of ranges of values herein is merely intended to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context. The use of any and all examples, or language suggesting that an example is being described (e.g., "such as"), provided herein is intended merely to better illuminate the systems and techniques and does not pose a limitation on the scope of the systems and techniques unless otherwise claimed.

All references, including publications, patent applications, and patents, cited herein are hereby incorporated by reference to the same extent as if respective references were individually and specifically indicated as incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system for deploying a release package for use in deploying software across multiple types of computing systems in a distributed computing system, the system comprising:
   a memory; and
   a processor, wherein the memory comprises instructions executable by the processor to:
      receive the release package comprising:
         a collection of deployable elements for use in deploying the software including a first deployable file to be installed on a first type of computing system and a second deployable file to be installed on a second type of computing system; and
         a release item;
      receive information associating the first deployable file with a first rule to trigger transmission of the first deployable file to the first type of computing system without triggering transmission of the first deployable file to the second type of computing system;
      in response to satisfying the first rule, transmitting the first deployable file corresponding to the software to the first type of computing system; and
      in response to the deployment of the software to the first type of computing system, initiate performance of an activity using the release item when a second rule is satisfied.

2. The system of claim 1, wherein the memory comprises instructions executable by the processor to configure the collection of deployable elements using configuration information derived from a configuration management database.

3. The system of claim 2, wherein the memory comprises instructions executable by the processor to:
   perform a discovery of a specified environment, wherein the discovery involves finding one or more computing devices of the specified environment;
   identify one or more corresponding configurations to each of the one or more computing devices; and
   in response to the discovery completing, update or create corresponding configuration items in the configuration management database for each of the one or more computing devices, wherein each configuration item is associated with its respective configuration information.

4. The system of claim 2, wherein the configuration management database comprises one or more standard configuration parameters for the collection of deployable elements, and wherein through using the standard configuration parameters, the configuration management database facilitates a deployment element configuration that is consistent from a first deployment to a second deployment.

5. The system of claim 1, wherein the information associating the first deployable file with the first rule is contained in the release package.

6. The system of claim 1, wherein the collection of deployable elements comprises one or more configuration files selected based on configuration information specifying an environment onto which the software is to be deployed.

7. The system of claim 1, wherein the release item comprises an approval workflow, a change request, a problem report, an incident report, one or more stories, a documentation element, release notes, or release documentation, or any combination thereof.

8. The system of claim 1, wherein the first rule and the second rule are associated with differentiating between the multiple types of computing systems.

9. The system of claim 8, wherein the first rule is configured to differentiate between the first type of computing system and one or more other types of computing systems such that the activity is performed in response to the specified type of computing system satisfying the first rule.

10. The system of claim 8, wherein the first rule specifies deployment of the first deployable file when the target computing system comprises the first type of computing system, and wherein a third rule specifies deployment of the first deployable file when the target computing system comprises the second type of computing system.

11. A system for deploying a release package for use in deploying software across multiple types of computing environments in a distributed computing system, the system comprising:
   a server device configured to communicatively couple to a target system, wherein the server device is configured to deploy at least a portion of the release package to the target system, and wherein the server device includes a memory and a processor, wherein the memory comprises instructions executable by the processor to:
      receive the release package configured to enable deployment of the software on the target system from the server device, the release package comprising a first deployable file to be installed on a first type of computing system, a second deployable file to be installed on a second type of computing system, and a release item, wherein the release package is associated with a rule specifying to transmit the first deployable file to the target system without transmitting the second deployable file when the target system comprises the first type of computing system;

in response to satisfying the rule, initiate deployment of the software to the target system at least in part by transmitting the first deployable file to the target system from the server device without transmitting the second deployable file when the target system comprises the first type of computing system; and perform an activity using the release item in response to a determination that the rule is satisfied.

12. The system of claim 11, wherein the first deployable file comprises one or more configuration files selected based on configuration information specifying at least one target computing environment onto which the software is to be deployed.

13. The system of claim 12, wherein the memory comprises instructions executable by the processor to configure the first deployable file using the configuration information, wherein the configuration information is derived from a configuration management database.

14. The system of claim 11, wherein the release item comprises at least one of a development story, incident report, problem report, change request, or documentation element.

15. A computer-implemented method for deployment of a release package for use in deploying software across multiple types of computing systems on a target computing system, the method comprising:

receiving, at a deployer, the release package for the deployment of the software on the target computing system from the deployer, the release package comprising a first deployable file to be installed on a first type of computing system, a second deployable file to be installed on a second type of computing system, and a release item, wherein the release package is associated with a rule specifying to transmit the first deployable file to the target computing system without transmitting the second deployable file when the target computing system comprises the first type of computing system;

in response to satisfying the rule, transmitting the first deployable file from the release package via the deployer to the target computing system; and performing an activity using the release item in response to a determination that the rule is satisfied.

16. The computer-implemented method of claim 15, wherein the activity comprises publishing the release item.

17. The computer-implemented method of claim 15, wherein the activity comprises updating the release item.

18. The computer-implemented method of claim 15, wherein the release item is configured to reference an additional release item.

19. The computer-implemented method of claim 15 wherein the release package is configured to facilitate the deployment of the software to the target computing system such that the release package corresponding to deploying the software on a first computing environment is also used to deploy the software on a second computing environment.

20. The computer-implemented method of claim 15, wherein the first deployable file comprises a software component, a configuration file, a development artifact, or any combination thereof, wherein the first deployable file is configured to be used to install, to configure, required for the functioning and use, or required for the execution of the subject software, or any combination thereof.

\* \* \* \* \*